Patented Jan. 7, 1930

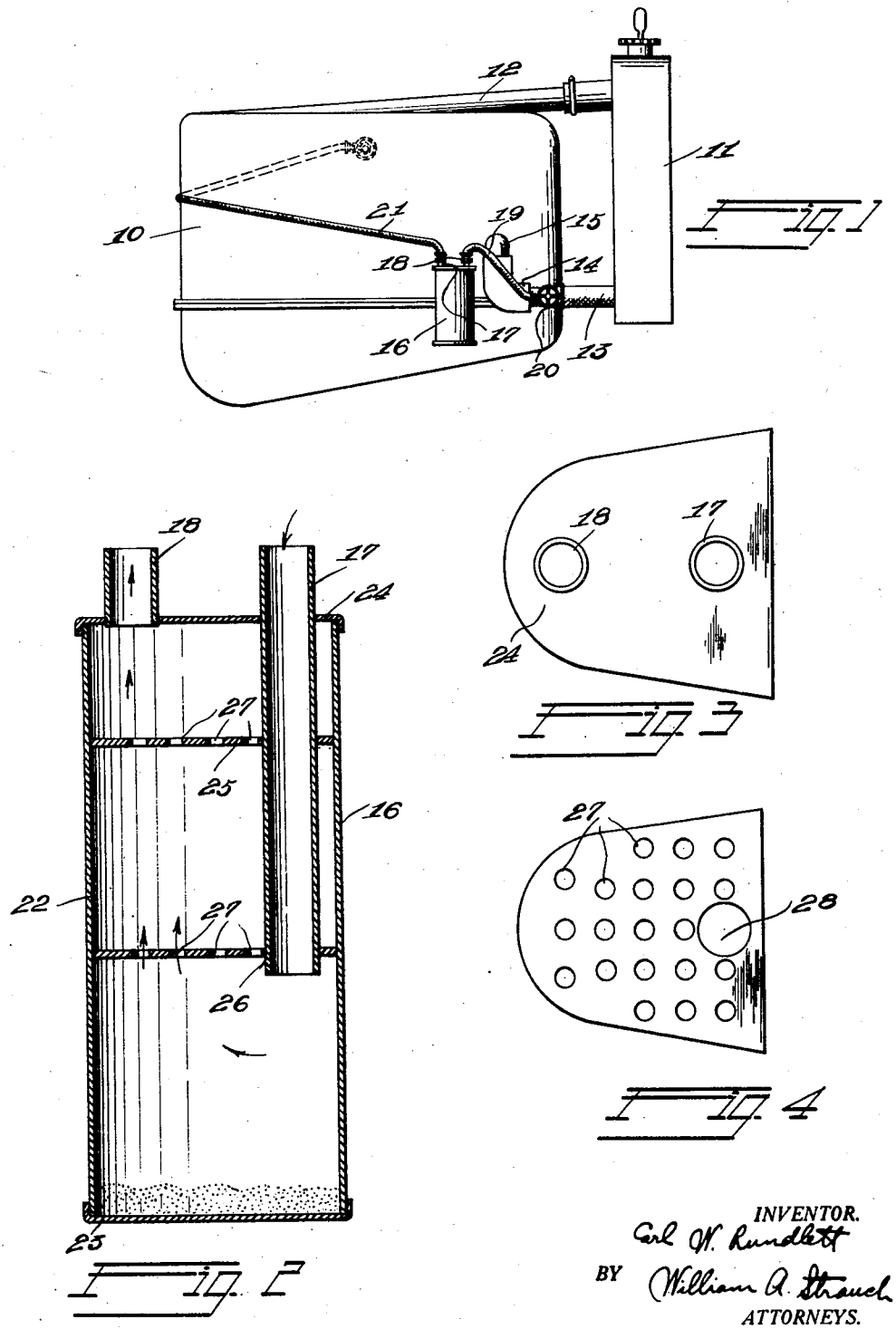

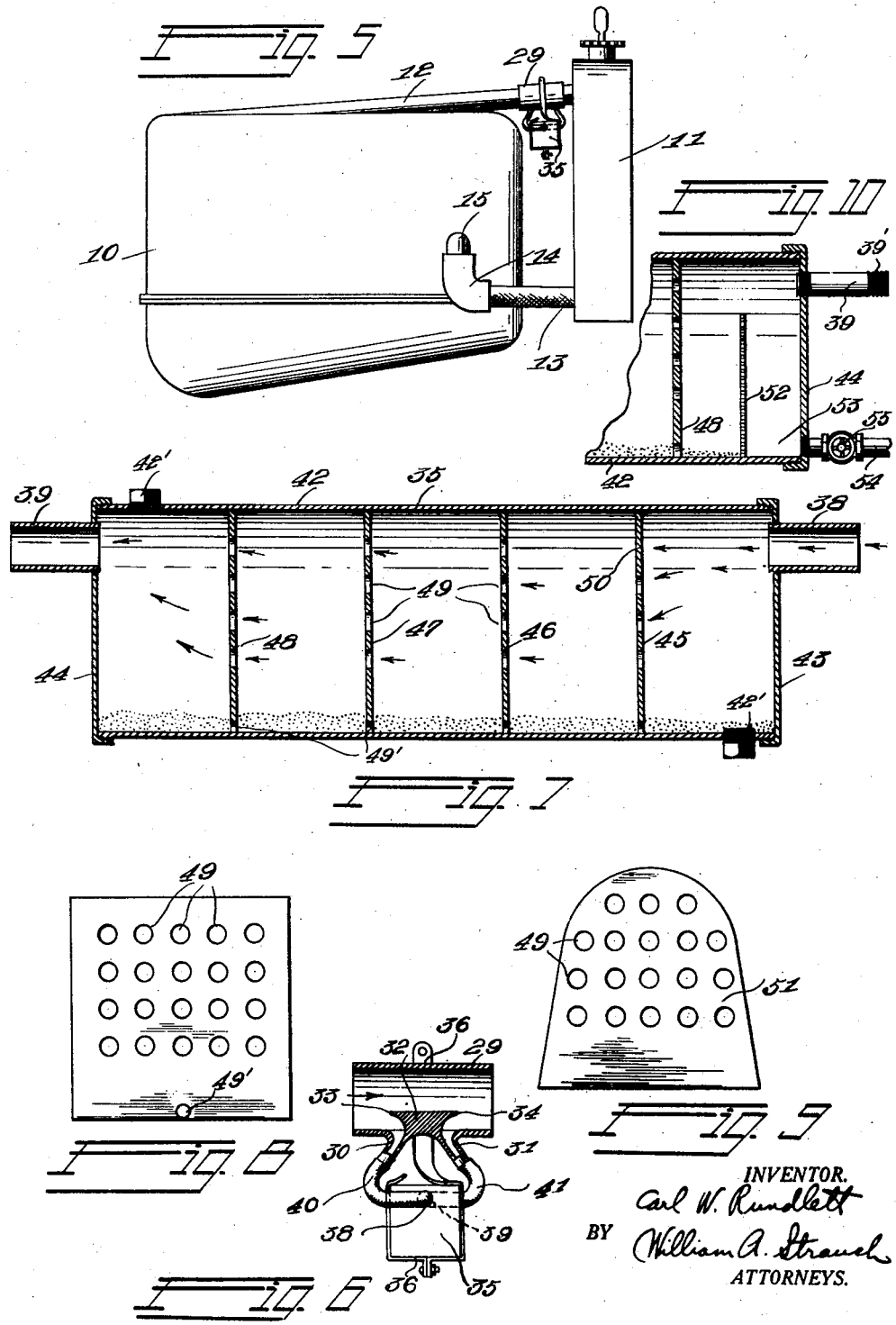

1,742,281

UNITED STATES PATENT OFFICE

CARL W. RUNDLETT, OF JACKSON HEIGHTS, NEW YORK, ASSIGNOR, BY MESNE ASSIGN-MENTS, TO LESLIE L. STEINDLER, OF NEW YORK, N. Y.

FILTERING METHOD AND APPARATUS

Application filed March 9, 1928. Serial No. 260,526.

This invention relates to a sediment collector or trap for the water of the engine cooling system of an internal combustion engine and is adapted for purifying gasoline and oil and the invention is especially designed for use in connection with the engine cooling system of an automobile.

In automobile engine cooling systems, utilizing water as the cooling medium, it is found that it is difficult to maintain the cooling medium free from suspended particles after continuous use of the same fluid over even a relatively short period of time. The impurities, mainly in the form of suspended particles of rust, dirt, and matter more or less similar to boiler scales produced by impurities in the water, etc., multiply rapidly in use and collect on the walls of the engine jacket, lowering the heat conductivity of said walls, and consequently the efficiency of the motor. Said particles also tend to collect in the relatively small radiator passages, especially in the side passages thereof where the circulation is at a minimum, eventually clogging said passages. In cold weather, the water in such clogged or semi-clogged passages freezes, resulting frequently in damage to the radiator, and of course, such clogging interferes seriously with the functioning of the radiator. In warm weather the total water capacity is reduced by the volume of such foreign matter, and the metal in the motor block and its parts, as well as the radiator metal, becomes partially insulated from the water by the deposition of sediment. The consequences of this is a very hot motor or "boiling" of the engine.

Heretofore, attempts have been made to ameliorate these conditions by inserting filters or sediment traps directly in the path of the cooling medium. These arrangements have not been entirely successful because they tended to substantially obstruct and interfere with the flow of the cooling medium, and because the flow of water was too rapid and the volume too great to permit the effective functioning of the trap. This invention is intended to obviate both of these difficulties by arranging the trap in a bypass so that the normal circulation of the water is not substantially affected by the action of the trap, and by retarding the movement of the water through the trap by restricting the quantity of water diverted from the cooling system and properly proportioning the diameter of the trap so that the flow therethrough shall be extremely slow. As the transporting power of water varies as the tenth power of its velocity, it will be seen that by so proportioning the diameter of the trap so that the flow therethrough shall be exremely slow, the transporting power of the liquid passing through the trap, will be greatly reduced and accordingly the sediment carried thereby permitted to settle in the bottom of the trap.

The primary purpose of the invention, accordingly, is to provide a method and apparatus for effectively removing the impurities from the cooling water that does not substantially interfere with the flow of said water and in which the flow of the water being purified is substantially retarded to a very small fraction of the normal rate of flow of said water through the system whereby a more effective purifying or sediment collecting action is obtained.

Another object of the invention is to provide a sediment collecting system in which the collector or trap is positioned in a by-pass so arranged that only a relatively small portion of the water flowing in the cooling system passes through the by-pass.

A still further object of the invention is to provide a sediment trap or collector that will be effective to so retard and interrupt the flow of suspended particles therethrough that a thoroughly efficient purifying action may be obtained without rapid clogging and which may be adapted for such uses as purifying gasoline or oil in an automobile.

A still further object of the invention is to provide a sediment trap that is extremely simple in construction and that can be inexpensively produced and installed in automobiles without materially altering or affecting the the engine cooling system.

Further objects of the invention will appear as a description thereof proceeds with reference to the accompanying drawings in which:

Figure 1 is a side elevation of an automobile engine equipped with one form of sediment trap of this invention.

Figure 2 is a vertical section on a larger scale of the trap included in Figure 1.

Figure 3 is a plan view of the trap shown in Figure 2.

Figure 4 is a plan of one of the baffle plates utilized in this trap.

Figure 5 is a side elevation of an automobile engine equipped with another form of trap arranged in accordance with this invention.

Figure 6 is a side elevation partly in section showing the means whereby a portion of the flow of water is diverted through the trap.

Figure 7 is a longitudinal section of the trap shown in Figures 5 and 6.

Figure 8 is a side view of one of the baffle plates utilized in this trap.

Figure 9 is a side view of a modified form of baffle plate that may be used when a semi-round type of trap is employed.

Figure 10 is a longitudinal section of the outlet end of a trap adapted to be installed in the gas line.

Like reference characters indicate like parts throughout the several figures.

In the drawings the numeral 10 indicates a jacketed internal combustion engine and 11 the water cooling radiator. The water flows from the jacket to the radiator through the conduit 12 and is returned, after being cooled therein, to the engine jacket by a conduit 13, a pump 14 and a conduit 15 extending between said pump and the engine jacket. The parts just described may be of any conventional or well known form.

A sediment trap or collector 16 provided with an inlet 17 and an outlet 18 is suitably mounted adjacent the engine 10. The outlet of the trap is connected by a conduit 19 to valve 20 connected to the suction side of pump 14. The inlet of the trap is connected by a conduit 21 to the water jacket of engine 10 on the side opposite to the connection 20 to suction side of pump 14, as shown in Figure 1.

By connecting trap 16 as disclosed a greater flow is induced therethrough due to inlet 17 being connected to the pressure side of the water jacket of engine 10 and the outlet 18 being connected to the suction side of pump 14, the combined action of pump 14 and the pressure in the water jacket of engine 10 positively inducing a flow through trap 16. The trap 16 comprises a shell 22 preferably of the form shown in Figure 3 though it should be understood that said shell may be cylindrical rectangular or any other suitable form. The ends of the shell are closed by caps 23 and 24, the latter being perforated to receive the inlet 17 which projects within the casing formed by the shell 22 and caps 23 and 24 to a point approximately centrally between said caps though said inlet may terminate at other points if desired. Extending across said shell in spaced relation to each other and to the caps just referred to are baffle plates 25 and 26 that are provided with relatively small apertures 27 and larger apertures 28 through which the inlet pipe 17 may pass. It is, however, to be understood that baffle plates 25 and 26 are not essential and may be eliminated.

In the operation of this form of the invention the pump 14 that causes the circulation of water through the engine cooling system causes a relatively small flow of water through the by-pass consisting of the conduits 19 and 21 and the trap 16, due to the fact that the resistance of the conduits 19 and 21 is small, compared to the resistance of the system. The water that flows through the by-pass passes into the trap which as shown on the drawings has a relatively large diameter so that the movement of the water through the trap is extremely slow. As a result the suspended particles in the water are permitted to settle to the bottom of the trap or on the baffle plates as the water circulates therethrough in the direction of the arrows shown in Figure 2. By arranging the trap in a by-pass of the main engine cooling system and diverting only a small portion of the flow of the cooling system to the trap the capacity of the system is not greatly increased and no substantial obstruction is presented to the free flow of the water in the cooling system while it is serving its cooling function. The water that is diverted from the cooling system is thoroughly cleansed of impurities and is returned to the main system in this condition. It has been found in practice that the arrangement is thoroughly effective to maintain the cool water free from impurities though only a small flow is maintained at one time through the trap.

In the modification of the invention shown in Figure 5 a trap is shown applied in a by-pass arranged in the connection 12 between the engine jacket and the radiator 11. In this form of the invention a short section 29 is arranged in the conduit 12. Said section is provided with tubular extensions 30 and 31 diverging on opposite sides of a diverting wall 32 having curved extensions 33 and 34 overhanging the entrance to the tubular extensions 30 and 31 as shown clearly in Figure 6.

A trap 35 having its axis extending transversely is supported by suitable hangers or brackets 36 from the section 29 in spaced relation beneath said tubular extensions. Said trap is provided with an inlet 38 and an outlet 39 that are put in communication respectively with the tubular extensions 30 and 31 by short flexible or other conduits 40 and 41.

The trap 35 is shown on an enlarged scale in Figures 7 and 8. Said trap comprises a rectangular shell 42 and end caps 43 and 44 provided with flushing plugs 42', having the inlet 38 and outlet 39 attached thereto adjacent the upper edge thereof. Arranged in spaced relation in the shell 42 are a plurality of baffle plates 45, 46, 47 and 48, each of which is provided with a multiplicity of relatively small openings 49 and other openings 49'. The openings 49 in adjacent baffle plates may be arranged in alignment with each other or in staggered relation as may be desired. Preferably, however, the baffle plate 45 is not provided with openings in alignment with the inlet 38 as shown at 50 so that the flow of water throgh said inlet may follow the direction of the arrows indicated in Figure 7. If desired, the shell 42 may be made semi-cylindrical, as shown in Figure 9 which illustrates a baffle 51 of the latter form, or it may be made of any other form.

In the operation of this form of the invention a relatively small portion of the flow of water passing through the section 29 in the direction of the arrow shown in Figure 6 is diverted by the wall 32 into the tubular extension 30 through the conduit 40 into the inlet 38 of the trap 35. The water thus diverted passes through said trap and returns to the system in purified condition through the outlet 39, conduit 41 and tubular extension 31. The flow of water over the top of the wall 32 tends to create a suction in the conduit 41 that contributes to the flow of water through the by-pass that includes the trap 35. In this way a small proportion of the water flowing in the engine cooling system is being purified continuously without substantial interference with the flow through the main system and it is purified more effectively than is possible in the main system because of the very slow rate of flow through the trap 35. In passing through said trap the impurities impinge against the baffle plates included therein and are permitted by the slow movement of the water therethrough to gradually settle to the bottom of the shell. In this manner the water in the engine cooling system is maintained substantially free of impurities that interfere with the efficient action of the cooling water and that sometimes interfere with the free flow of that water through the relative narrow passages of the radiator. By removing the plugs 42' the trap can be flushed out, the sediment passing through the openings 49' in the baffle plates.

The form of my invention shown in Figure 10 is adapted to be installed in the gasoline line of an automobile and is a modification of the structure shown in Figure 7 and is arranged to function both as a trap for gasoline and as an emergency gasoline reserve receptacle or tank.

In this form of invention, the inlet and outlet 38 and 39 respectively are terminally threaded as indicated at 39' whereby the trap can be detachably installed in the gasoline line of an automobile by engagement of suitable unions with threaded terminals 39'. Disposed within shell 42 intermediate end cap 44 and adjacent baffle plate 48 is a vertically disposed partition 52 in the form of a screen which terminates at or slightly below outlet 39 as shown in Figure 10, thus providing a chamber 53. The screen 52 is not essential, however, to the effective operation of the trap and may be omitted.

My improved trap is designed for installation in the gasoline line of an internal combustion engine of an automobile intermediate the vacuum tank and the carburetor so that gasoline from the trap will feed to the carburetor by gravity, and through an emergency feed line or conduit 54 provided with a valve 55. Line 54 is detachably connected with end cap 44 and gasoline line to the carburetor to put the bottom of chamber 53 into communication with the carburetor. The trap is adapted for use whether or not a vacuum tank is employed and is adapted to be used in automobiles having gasoline feed systems consisting of a vacuum tank, pressure or gravity devices.

In the operation of this form of the invention, valve 55 is normally closed and the gasoline is purified in the same manner as above set forth relative to the water trap shown in Figure 7, thus removing suspended particles in the gasoline and avoiding the collection thereof in the carburetor and consequent interruption of gasoline supply to the motor.

Should the motor of an automobile supplied with my improved gasoline trap cease operating, due to the lack of gasoline, the operator opens valve 55 putting chamber 53 into communication with the gasoline line, thus permitting the gasoline within the receptacle defined by the shell 42 and end caps 43 and 44 to flow by gravity to the carburetor, the screen partition 52 when employed preventing the sediment deposited in the bottom of shell 42 entering the line 54 and consequently choking up the carburetor.

As will be observed, the receptacle defined by shell 42 and end caps 43 and 44 is of substantial capacity and is capable of containing a sufficient volume of gasoline, which is always at a level with the bottom of outlet 39 when valve 55 is closed, to enable the operator to resume his journey to a gasoline station where he may replenish his supply of fuel.

Thus it will be seen that a combined trap and emergency reserve gasoline receptacle is provided which prevents the entrance of foreign matter into the carburetor and further affords a convenient reserve gas supply which enables the operator to travel to a nearby gasoline station should he discover that his operating gas supply is exhausted.

The trap herein disclosed is equally applicable to the purifying of oil. As will be noted, the traps in all forms of the invention disclosed are of considerably greater transverse area than that of the inlets and outlets, as a consequence of which the velocity of flow of water, gas, or oil through the trap will be reduced substantially in proportion to the ratio of the transverse area of the inlet to the transverse area of the trap which if eight times that of the inlet, the velocity of the water or gas upon entering the trap will be reduced to one-eighth of the velocity before entering the trap. The water gasoline or oil will accordingly flow through the trap very slowly permitting fine suspended foreign matter carried thereby to settle to the bottom of the trap as indicated in Figures 2, 7 and 10. In practice the proportions just mentioned permit the deposit of very fine and substantially flocculent solids in the trap from the liquids passing therethrough.

The provision of the baffle plates while not necessary assists in the separation of the suspended matter from the water, gas, or oil as upon successive impinging against the baffle plates the suspended matter is checked in its movement through the trap and due to the slow movement of the water, gas, or oil readily settle to the bottom thereof.

The improved trap is effective in its operation when confined to a proportion of the water in the circulating cooling system; the trap being incorporated in a by-pass of any character through which the proportion of water is circulated, and accordingly the trap may be employed in the orignal construction of the radiator by incorporating it in a simple by-pass extending along the inside of the radiator and connected with the inlet and outlet at the opposite ends thereof.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim as my invention is:—

1. In combination with the water cooling system of an internal combustion engine, a by-pass arranged to receive a portion only of the flow of water through said system a sediment trap in said by-pass, and means to return the water to said system.

2. In combination with the water cooling system of an internal combustion engine, a by-pass arranged to receive only a relatively small portion of the flow of water in said system, a sediment trap in said by-pass, and means to return the water to said system.

3. In combination with the water cooling system of an internal combustion engine, a by-pass arranged to receive only a relatively small portion of the flow of water in said system, a sediment trap arranged in said by-pass having a relatively large cross sectional area compared to the cross sectional area of the by-pass whereby the relatively small flow through the by-pass is substantially retarded in said trap, and means to return the water to said system.

4. In combination with the water cooling system of an internal combustion engine, a by-pass arranged to receive a restricted flow of the water and to return it to said system, a sediment trap arranged in said by-pass comprising a shell of relatively large cross-sectional area compared to the area of the by-pass and baffle plates to interrupt the flow of the water and cause separation and settling of impurities in said water.

5. In combination with the water cooling system of an automobile including a radiator and a jacketed internal combustion engine and conduits connecting the radiator and engine jacket, a diverter arranged between said radiator and jacket and having a wall projecting into and diverting a portion only of the flow in one of said conduits, inlet and outlet passages adjacent said wall and means including a sediment trap joining said passages to form a by-pass for the water around said wall and to return it to said system after passing through said trap.

6. The combination defined in claim 5 in which the sediment trap comprises a shell having a cross-sectional area greatly in excess of the area of said passages and baffle means arranged across said shell to cause suspended particles to be precipitated in said shell.

7. The method of cleaning the cooling medium of an internal combustion engine which consists in by-passing a portion only of the continuously circulating medium through a sediment trap arranged in the by-pass and continuously returning the medium to said system while maintaining the circulation of the cooling medium substantially unimpaired.

8. The method of cleaning the cooling medium of an internal combustion engine which consists in diverting only a restricted portion of the flow of said medium into a by-pass, purifying the medium passing through said by-pass and returning the purified medium to the system.

9. The method of cleaning the cooling medium of an internal combustion engine which consists in continuously diverting only a restricted portion of the flow of said medium into a by-pass, retarding the rate of flow through said by-pass, purifying the medium while its rate of flow is retarded, and returning the purified medium to the system.

10. In combination with a closed system through which a cooling liquid is repeatedly circulated, of a sediment trap arranged outside said system and means to divert a relatively small portion of the circulated liquid to said trap and to return the diverted liquid to said system after it has passed through said trap.

11. The combination as defined in claim 10, in which said last named means comprises a conduit of restricted capacity compared to the capacity of the passages in said system and in which said trap constitutes a receptacle having a cross sectional area transverse to the direction of flow of liquid through said trap many times in excess of the cross sectional area of said conduit, whereby the rate of flow through said trap is low.

12. In combination with the closed water cooling system of an internal combustion engine arranged so that the cooling liquid therein is repeatedly circulated, of a sediment trap and means to divert a relatively small portion of the liquid being circulated under pressure caused by said circulation to said trap and to return the diverted liquid to said system after it has passed through the trap.

In testimony whereof I affix my signature.

CARL W. RUNDLETT.